United States Patent [19]

Black et al.

[11] Patent Number: 5,168,378

[45] Date of Patent: Dec. 1, 1992

[54] MIRROR WITH DAZZLE LIGHT ATTENUATION ZONE

[75] Inventors: Michael Black, Foster City; Vladimir Kupershmidt, Fremont, both of Calif.

[73] Assignee: Reliant Laser Corporation, Foster City, Calif.

[21] Appl. No.: 833,010

[22] Filed: Feb. 10, 1992

[51] Int. Cl.⁵ .............................................. G02F 1/13
[52] U.S. Cl. ...................................... 359/38; 359/70; 359/72; 359/79; 359/63; 359/85
[58] Field of Search ........................ 359/38, 54, 63, 70, 359/72, 79, 85

[56] References Cited

U.S. PATENT DOCUMENTS

| | | | |
|---|---|---|---|
| 4,623,222 | 11/1986 | Itoh et al. | 359/38 |
| 4,655,549 | 4/1987 | Suzuki et al. | 359/85 |
| 4,669,827 | 6/1987 | Fukada et al. | 359/85 |
| 4,671,617 | 6/1987 | Hara | 359/38 |
| 4,693,558 | 9/1987 | Nakaho et al. | 359/85 |
| 4,696,548 | 9/1987 | Ueno et al. | 359/70 |

Primary Examiner—William L. Sikes
Assistant Examiner—Huy K. Mai
Attorney, Agent, or Firm—David Pressman

[57] ABSTRACT

A liquid-crystal matrix-type reflection mirror (10) with a localized dazzle light attenuation zone. The mirror has a multilayered structure and consists of a broadband reflective base mirror (12) having maximum reflectivity in the range corresponding to spectral range of halogen lamps of automobile headlights. Deposited on the base mirror are a matrix transparent electrode (14) and a photoconductive layer (20) placed on the matrix transparent electrode. The photoconductive layer (20) and the matrix transparent electrode (14) have a matrix-type structure formed as a pixel array. Each pixel of the matrix transparent electrode (14) is a projection of an overlaid pixel of the photoconductive layer (20). The multilayered structure further includes the following subsequent layers: a rear polarizer (22) which has a predetermined axis of polarization and is placed on the photoconductive layer, a common transparent electrode (36), a liquid crystal (25) sandwiched and sealed between the rear polarizer (22) and the common transparent electrode (36), a front polarizer (42), and an antireflection coating (44). The mirror (10) has a control circuit connected between the common transparent electrode (36) and the matrix transparent electrode. The control circuit applies a control voltage to the liquid crystal in accordance with the incident light. The pixel enabling just the dazzle light zone to be attenuating.

20 Claims, 3 Drawing Sheets

MIRROR WITH DAZZLE LIGHT ATTENUATION ZONE

BACKGROUND OF THE INVENTION

1. Field of the Invention

The present invention relates to mirrors, particularly to vehicle rearview mirrors capable of automatically blocking excessive light levels, e.g., caused by headlight glare.

2. Description of Prior Art

During night driving, when a first car is followed by another car which has its bright lights on, these bright lights are reflected from the rearview mirror into the eyes of the car's driver. This can seriously impair the driver's forward vision because the light scatters within the driver's eyes, causing a "veil" or "curtain" of light over the scene. The driver therefore has reduced ability to detect objects which are dimly lit or have little contrast with the background. This situation is known as visibility glare. The driver is normally unable to detect this loss of visibility since it produces no physical sensation. At higher reflected light levels, discomfort glare occurs, resulting in an unpleasant physical sensation in the driver's eyes.

To alleviate this problem, manually actuated rearview mirrors have been developed which include "day" and "night" settings. These day-night mirrors are installed almost in all modern cars and include mirrors joined at an angle to form a prism and a mechanism for changing the angular orientation of the prism. The front mirror is half-silvered. In the day setting, the rear mirror is angularly set to the working position to provide approximately 80% reflectance. In the night setting, the front mirror is angularly set to the working position to provide only approximately 4% reflectance.

Additionally, automatic day-night rearview mirrors have been developed which automatically switch the mirror prism between full and partial reflectance states in response to sensed light levels. One such mirror is illustrated in Bauer et al. U.S. Pat. No. 4,443,057, issued Apr. 17, 1984. The Bauer mirror includes a forward light sensor for measuring light in the forward direction, a rear light sensor for measuring light in the rear direction, and a control circuit responsive to the forward and rear light sensors to control the mirror prism.

These automatic mirrors all suffer a common drawback. Specifically, the light sensors used in these mirrors have a response to the electromagnetic spectrum which is substantially different from the spectral response of the human eye. Accordingly, the sensitivities of the light sensors to visible and invisible wavelengths are different from the sensitivities of the human eye. Most notably, light sensors are extremely sensitive to infrared and longer wavelengths which cannot be seen by the human eye. Infrared wavelengths are prevalent in artificial lighting and particularly in tungsten filament bulbs. The light sensors detect relatively high light intensities when viewing headlights, taillights, streetlights, or any other source of infrared wavelengths. Consequently, the reflective element of a mirror incorporating such sensors is driven to an inappropriate reflective state. The mirror therefore is actuated when not necessary to meet the sensitivity of the human eye. Either inadequate image information is presented to the driver and/or excessive glare from the rearview mirror is directed to the driver's eye.

An attempt has been made to obviate the disadvantages of the above-mentioned light sensors by utilizing filtered light sensors of the type described in E. Gahan U.S. Pat. No. 4,799,768 issued Jan. 24, 1989. The Gahan light sensor includes a detector responsive to electromagnetic wavelengths and a filter for filtering the wavelengths received by the detector so that the spectral response of the light sensor approximates the spectral response of the human eye. Nevertheless, this rearview mirror switches into the "night" state the entire surface of the mirror. Furthermore, this mirror is based on the use of light sensors, and such sensors essentially attenuate the incident light to a certain level, or otherwise reflect the incident light in a certain direction. This causes distortion of a reflected image.

Another disadvantage, common to all two-position prism mirrors, is that such a prism is strictly a dual reflectance device which allows no option for a continuously variable reflectance or for intermediate reflectance states. Dual reflectance mirrors are highly inadequate because they distort and shift images.

A glare-free reflection mirror is shown in H. Itoh et al U.S. Pat. No. 4,721,364, issued Jan. 26, 1988. This mirror has an electro-optical element, the transparency of which is changed by applying an electric field to this element. The mirror is divided into a dazzle-free zone in the lower part of the mirror's surface and a non-dazzle-free portion at the rest of the mirror's surface. Such rough regional localization of the mirror's surface reduces the field of vision at nighttime. Furthermore, the Itoh mirror possesses the same disadvantages as the other sensor-type mirrors described above.

Recently, rearview mirrors using liquid crystal devices having light absorption properties have been designed. One such nonglaze mirror is described in K. Hara U.S. Patent 4,671,617, issued Jun. 9, 1987. Mirrors of this type incorporate a liquid crystal device. In this device, the orientations of the liquid crystal molecules are changed to absorb light when the amount of the light incident on the mirror exceeds a certain limit.

There are many other dazzle-free mirrors based on the use of liquid crystals which are described in various publications. Each such mirror is aimed at elimination of certain drawbacks of the existing liquid-crystal mirrors, such as prevention of a chemical reaction in the dichromatic dye of the liquid crystal (E. Lee at al. U.S. Pat. No. 4,848,878 issued 18, 1989), provision of control device for automatically initializing the antidazzle mirror to a selected mode of a predetermined antidazzle or dazzle state, when power is applied from a battery (H. Demura et al. U.S. Pat. No. 4,786,145 issued Nov. 22, 1988,) elimination of interference fringes which often occur under monochromatic light sources, such as sodium or mercury lamps (found over highways), or halogen lamps of automobiles (Y. Shirai U.S. Pat. No. 4,729,638), etc.

A common disadvantage of all existing liquid-crystal dazzle-free mirrors is that they cannot provide efficient attenuation of the dazzling light. This is because the light attenuation effect is distributed over the entire surface of the mirror, causing the entire mirror to become dim even through a bright light shines in only a small area of the mirror.

OBJECTS AND ADVANTAGES OF THE INVENTION

It is therefore an object of the invention to eliminate the above disadvantages, i.e., to provide a liquid-crystal matrix-type reflection mirror with dazzle light attenuation zone which improves driver's ability to detect objects which are dimly lit, does not cause an unpleasant physical sensation in the driver's eyes, has a response to the electromagnetic spectrum which is substantially similar to the spectral response of the human eye, produces a non-distorted image, ensures high dazzling light attenuation efficiency and localizes the attenuation action to the area of the image of the dazzling light source.

Further advantages and features of the invention will become apparent from a consideration of the ensuing description and drawings.

BRIEF DESCRIPTION OF DRAWINGS

FIG. 3a is a plot of the incident power distribution over the mirror length for the case shown in FIG. 3a.

FIG. 3b is a plot of the reflected power distribution for the case shown in FIG. 3a.

REFERENCE NUMERALS USED IN THE DESCRIPTION AND DRAWINGS

Figure 1:
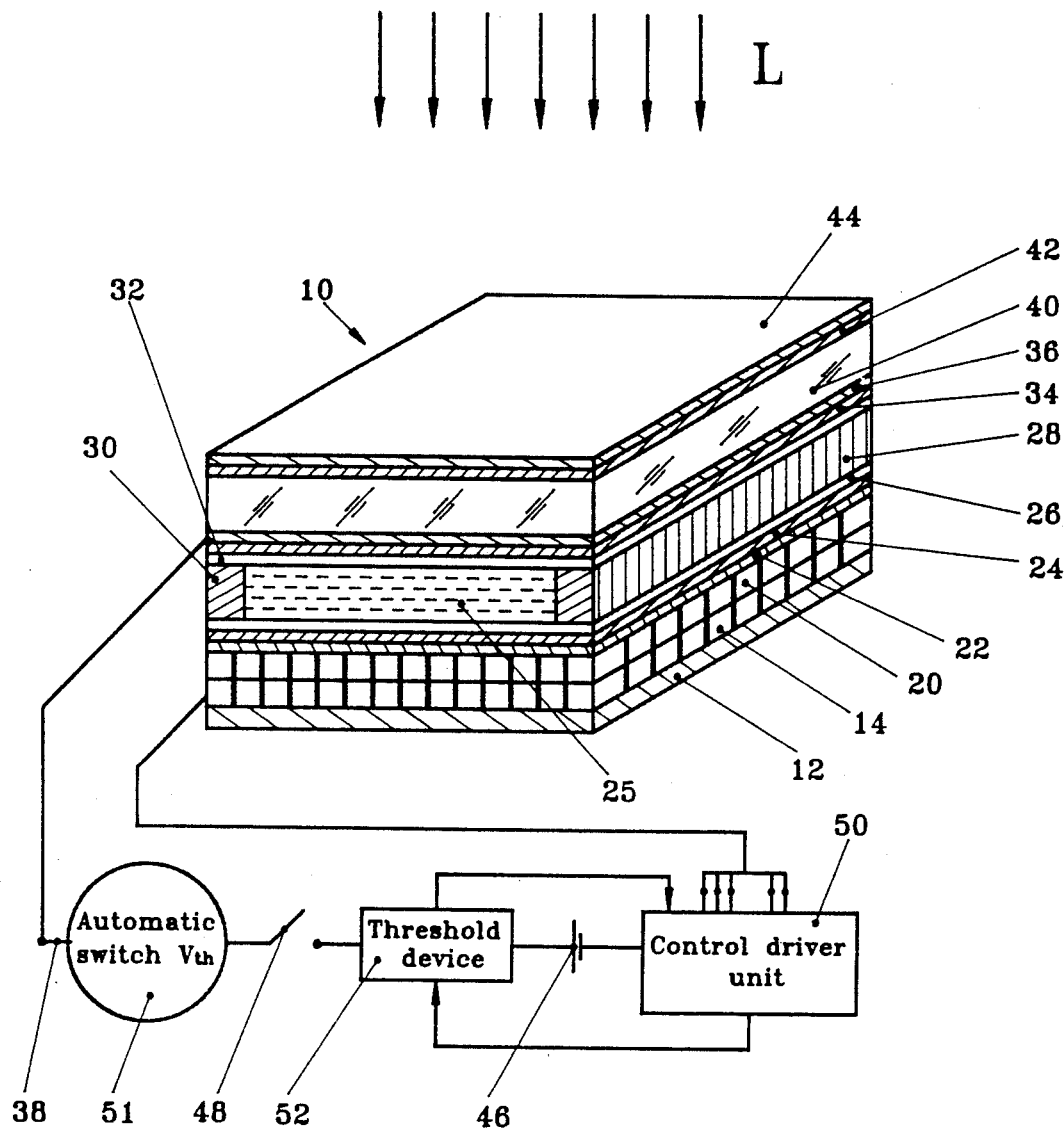
FIG. 1 is a schematic cross-sectional view of a multilayered, liquid-crystal, matrix-type, antidazzle mirror of the invention.

10 — multilayered liquid-crystal matrix-type reflection mirror
12 — broad-band reflective mirror
14 — matrix layer
14a, 14b, ... 14n — pixels
16a, 16b, ... 16n — electrodes
18a, 18b, ... 18n — terminals
20, 70, 72 — photoconductive layers
20a, 20b, ... 20n — pixels
22 — rear polarizer
25 — liquid crystal
26 — thin insulation layer
28, 30 — spacers
32 — insulation layer
34 — orientation layer
36 — transparent common electrode
38 — terminal
40 — transparent glass substrate
42 — front polarizer
44 — antireflection layer
46 — power source
48 — switch
50 — control driver unit
51 — automatic switch
52 — threshold device
53 — charged carriers
62 — two-pixel cell
66, 68 — ITO pixels

FIG. 1 — DETAILED DESCRIPTION OF THE APPARATUS OF THE INVENTION

FIG. 1 is a cross-sectional view of a multilayered liquid-crystal matrix-type reflection mirror 10 of the invention, together with a control circuit.

Mirror 10 has a multilayered structure. A substrate layer 12 comprises a reflector with a broadband spectral reflectivity. Layer 12 may be a broadband reflective surface comprising a glass plate coated with a special reflection coating (not shown). This special coating has maximum reflectivity in the range corresponding to spectral range of halogen lamps of automobile headlights. A suitable material for the coating is a layer of magnesium fluoride, 5–15 μm thick.

The outer surface of layer 12 is coated with a transparent conductive matrix layer 14, e.g., of indium tin oxide (ITO), which is made in the form of a pixel array. A pixel is the smallest element of an image that can be individually processed in an optical or in a TV system. In FIG. 1, respective pixels are designated by reference numerals 14a, 14b, ... 14n. Each pixel has a rectangular shape and has a dimension of about 50 to 150 μm. Pixels 14a, 14b, ... 14n have respective electrodes 16a, 16b, ... 16n, respectively. One end of each electrode is electrically connected to the respective pixel. The other ends of electrodes 16a, 16b, ... 16n form respective terminals 18a, 18b, ... 18n. Matrix layer 14 may have a thickness within the range of 7 to 15 μm.

Matrix layer 14, in turn, is coated with a photoconductive layer 20 of photoconductive semiconductor material, such as cadmium selenide or cadmium sulfide. Photoconductive layer 20 also is made in the form of a pixel array with pixels 20a, 20b, ... 20n which have the same dimensions and pattern as pixels 14a, 14b, ... 14n. Layer 20 is deposited onto layer 14 so that the pixels of layer 20 overlie those of layer 14, respectively. Layer 20 has a thickness of about 5 to 10 μm. Because CdSe/CdS semiconductor material efficiently absorbs light and therefore causes photoexcitation of charge carrier, a ratio of its electrical resistance in a nonilluminated state to a similar characteristics in an illuminated state is about $10^4$. In other words, if a bright light passes through a zone of layer 20, the electrical resistance of this zone becomes $10^4$ times higher than in the nonilluminated zones.

Photoconductive layer is coated with a thin-film linear rear polarizer 22. Polarizer 22 is made of a polymeric plastic and has a thickness of about 2 to 3.5 mm.

Polarizer 22 is coated with an orientation layer 24 which, on its side opposite to polarizer 22, has orientation grooves (not shown) intended for proper orientation of molecules of a liquid crystal 25 which is described below. The structure and application technique of this layer is known in the art of liquid crystal display and is beyond the scope of the present invention. Orientation layer 22 can be made, e.g., of a structured polymer.

Orientation layer 24 is coated with a thin insulation layer 26 which repeats the shape of the above-mentioned grooves and is intended for preventing leakage of ITO from layer 14 to the liquid crystal.

Placed onto insulation layer 26 is liquid crystal 25 which is sealed over the entire periphery of mirror 10 by spacers 28 and 30. Liquid crystal 25 may comprise a conventional nematic-type liquid crystal such as that sold under the trademark Merck ZLF-2244-100 by Merck & Co., Inc. of Rahway, N.J., USA.

From the side opposite to broadband reflective mirror 12, liquid crystal 28 is coated with an insulation layer 32 and then with an orientation layer 34. In their structure and dimensions, insulation layer 32 and orientation layer 34 are the same as insulation layer 26 and orientation layer 24 and are symmetrically arranged with respect to the above. A package consisting of liquid crystal 28 sandwiched between two pairs of the isolated orientation layers may have a thickness of about 10–15 μm.

Orientation layer 34 of the liquid crystal package is further coated with a thin continuous transparent ITO electrode 36. Electrode 36 has only one terminal 38.

Electrode 36 is covered with an optical-quality transparent glass substrate 40 having a thickness of about 2-3 mm.

Glass substrate 40 is coated with a front thin-film polarizer 42. The uppermost layer of entire mirror 10 which faces the incident light is coated with an antireflection layer 44.

In FIG. 1, direction of the incident light is designated by letter L.

Terminals 16a, 16b, . . . 16n, and 38 are connected to an electric power source 46 through a manually-controlled electric switch 48, a control driver unit 50, and a threshold device 52. Driver unit 50 is located between power source 46 and switch 48, while threshold device 52 is located between power source 46 and terminals 16a, 16b, . . . 16n. Switch 48 is located between terminal 38 and driver unit 50. The circuit contains another automatic switch 51 which connects power source 46 to mirror 10 through a car ignition circuit (not shown), so that when the engine is OFF, the terminals of mirror 10 are disconnected from power source 46. When the ignition key is turned and the car engine begins to operate, the terminals of mirror 10 are automatically connected to the power source.

Driver unit 50 is a device which control operation of mirror 10 by applying different voltages to pixel 14. Driver unit is a standard device widely used in the art for controlling various instruments which utilize liquid crystals. An example of driver unit 50 is a liquid crystal control device of the type used in a spacial light modulator produced by Control Optics, Inc., Los Angeles, Calif. The structure of this unit is known and will thus not be detailed here.

The threshold value of threshold device 52 is a predetermined intensity of dazzling or glare light which falls on mirror 10. If necessary, threshold device 52 can be adjustable so that the threshold value can be chosen to match individual requirements.

Figure 2:
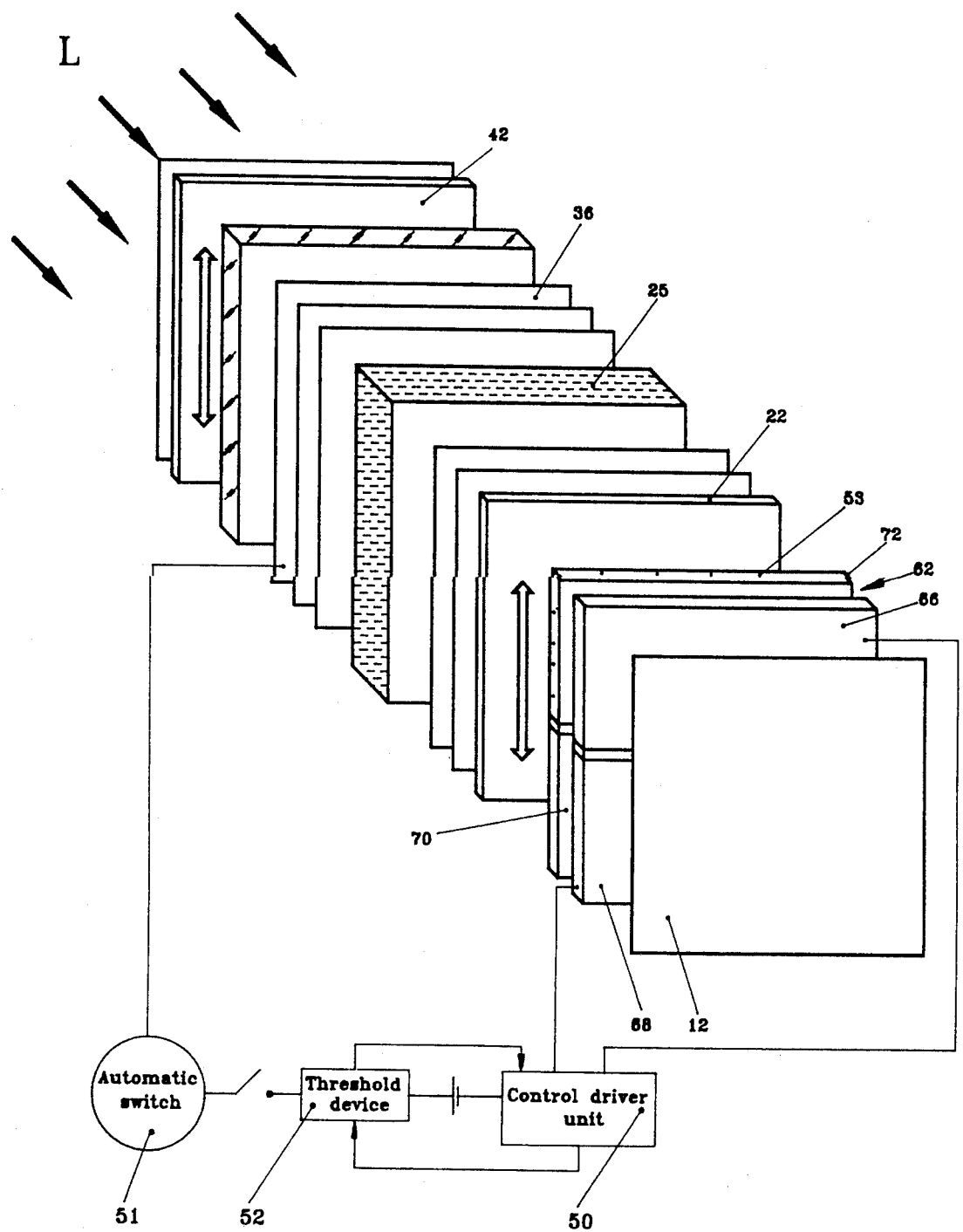
FIG. 2 is simplified perspective view of a two-pixel system illustrating the principle of operation of the mirror.
Figure 3A:
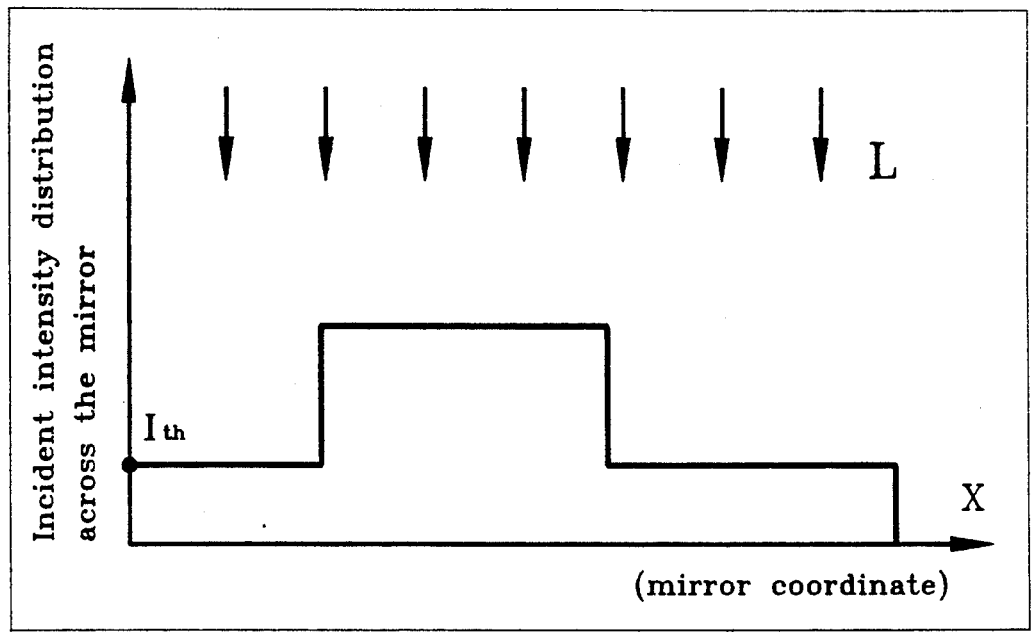
Figure 3B:
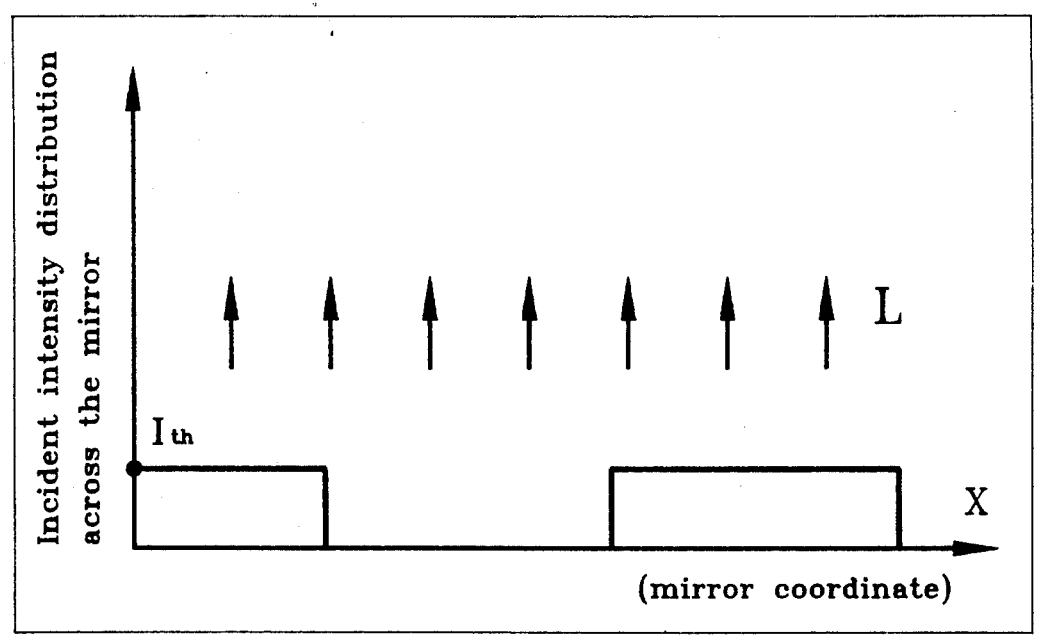

FIGS. 1 THROUGH 3 — OPERATION OF THE LIQUID-CRYSTAL MATRIX-TYPE REFLECTION MIRROR

For the sake of simplicity and or better understanding the principle of operation of mirror 10 of the invention, the device is illustrated in a perspective view schematically in FIG. 2 in the form of a two-pixel system.

The system consists of a front polarizer 42, an ITO common electrode 36, a twisted nematic liquid crystal 25, a rear polarizer 22, a two-pixel cell 62, and a broadband reflective mirror 12. All the above units are arranged sequentially in the direction of the incident light.

Two-pixel cell 62 consists of two ITO pixels 66 and 68 which are on the rear polarizer side are overlaid with photoconductive layers 70 and 72, respectively.

Front polarizer 42 and rear polarizer 22 have optical axes parallel to each other.

Common electrode 36 and pixel cell 62 are interconnected through a driver unit 50 and a threshold device 52.

In fact, the system shown in FIG. 2 is a simplified version of the device shown in FIG. 1, but in a perspective view.

When light L has intensity lower than a predetermined value $P_{th}$, driver unit 50 applies a voltage to liquid crystal 25 via threshold device 52. This voltage exceeds a voltage threshold value $V_{th}$ corresponding to the threshold incident power. The threshold incident power is assumed as a value of intensity at which the light of automobile headlights which falls onto mirror 10 is considered dazzling or glaring for an average person. In this case light L passes through front polarizer 42 and liquid crystal 25 without the change in polarization. This means that the light will pass through rear polarizer 22 and pixel cell 62, then fall on broadband reflective mirror 12, and then it will be reflected back without noticeable attenuation.

Assume now that the light passing through upper pixel 66 has an intensity higher than $P_{th}$. In this case, while passing through both polarizers, the light will cause photoexcitation of charge carriers 67 in photoconductive layer 70. As a result, the voltage between ITO electrode pixel 62 and common electrode 36 drops below the threshold $V_{th}$. After being reflected from broadband reflective mirror 12, the reflected light passes through liquid crystal 25. Its direction of polarization will be changed by 90° and will be blocked by front polarizer 42. This means that part of the incident light which had intensity higher than the threshold P will be substantially attenuated.

The process described above is graphically shown in FIGS. 3a and 3b, where FIG. 3a is incident power distribution over the mirror length and FIG. 3b is reflected power distribution for the case shown in FIG. 3a.

Although the device of FIG. 2 has been shown schematically with a two-pixel electrode, this two-pixel construction has been shown only for the sake of simplicity. In a practical antidazzle mirror, the number of pixels will be much higher, as each pixel will have a dimension of about 100 to 300 μm.

SYNOPSIS, RAMIFICATIONS AND SCOPE

Thus we have provided a liquid-crystal matrix-type reflection mirror 10 with localized dazzle light attenuation. This improves driver's ability to detect objects which are dimly lit, does not cause an unpleasant physical sensation in the driver's eyes, produces a response to the electromagnetic spectrum which is substantially similar to the spectral response of the human eye, produces a non-distorted image, ensures high dazzling light attenuation efficiency and localizes the attenuation action to the area of the image of the dazzling light source.

Although the antidazzle mirror has been shown and described with reference to one specific embodiment, this embodiment, its parts, materials, and configurations have been given only as examples, and many other modifications are possible. For example, a supertwisted liquid crystal may be used instead of twisted liquid crystal 25. In this case, the front and rear polarizers will have another orientation, which will depend on the type of the liquid crystal used. A mirror of any other type can be used instead of broadband reflective mirror, provided this mirror has an appropriate reflecting coating.

In the illustrated embodiment, while transparent conductive coating layer 14 was made of indium tin oxide (ITO), this layer may be made of other materials.

Orientation layer 22 may have a preferable orientation determined by oblique incidence of coating particles forming this layer.

Photoconductive layer 20 may be made of materials other than cadmium selenide and cadmium sulfide.

Mirror 10 may be used, not only as a rearview mirror of an automobile, but for any other purposes where it is necessary to attenuate the reflected dazzling light. E.g., mirror 10 can be used in photo studios, vanity mirrors, beauty parlors, etc.

Therefore, the scope of the invention should be determined, not by the example given, but by the appended claims an their legal equivalents.

What we claim is:

1. A liquid-crystal matrix-type reflection mirror with a localized dazzle light attenuation zone, said mirror having a multilayered structure and comprising:
   a base mirror having a broadband spectral reflectivity;
   a matrix transparent electrode on one side of said base mirror;
   a photoconductive layer on said matrix transparent electrode;
   a rear polarizer placed on said photoconductive layer and having a predetermined axis of polarization;
   a common transparent electrode above said rear polarizer;
   a liquid crystal sandwiched and sealed between said rear polarizer and said common transparent electrode;
   a front polarizer on said common electrode, said front polarizer having an outer surface and an axis of polarization parallel to said predetermined axis of polarization; and
   a control circuit connected between said common transparent electrode and said matrix transparent electrode, said control circuit having means for applying a voltage to said common transparent electrode and said matrix transparent electrode.

2. The liquid-crystal matrix-type reflection mirror of claim 1 wherein said base mirror has maximum reflectivity in the range corresponding to the spectral range of halogen lamps of motor vehicle headlights.

3. The liquid-crystal matrix-type reflection mirror of claim 2 wherein said photoconductive layer and said matrix transparent electrode have a matrix-type structure formed as a pixel array, each pixel of said matrix transparent electrode being a projection of an overlaid pixel of said photoconductive layer.

4. The liquid-crystal matrix-type reflection mirror of claim 3, further including a first insulation layer between said liquid crystal and said rear polarizer, a second insulation layer between said liquid crystal and said front polarizer, a first orientation layer between said first insulation layer and said rear polarizer, and a second orientation layer between said second insulation layer and said front polarizer.

5. The liquid-crystal matrix-type reflection mirror of claim 4, further including an antireflection coating on said outer surface of said front polarizer.

6. The liquid-crystal matrix-type reflection mirror of claim 5 wherein said mirror is a rearview mirror of an automobile.

7. The liquid-crystal matrix-type reflection mirror of claim 2 wherein said common transparent electrode, and said matrix transparent electrode are made of indium tin oxide, and said photoconductive layer is made of a material selected from the group consisting of cadmium selenide and cadmium sulfide.

8. The liquid-crystal matrix-type reflection mirror of claim 1, further including a photoconductive layer on said matrix transparent electrode, said photoconductive layer and said matrix transparent electrode having a matrix-type structure formed of an array of pixels, each pixel of said matrix transparent electrode being a projection of and aligned with a corresponding pixel of said photoconductive layer.

9. A liquid-crystal matrix-type reflection mirror with a localized dazzle light attenuation zone, said mirror having a multilayered structure and comprising:
   a broadband reflective base mirror having maximum reflectivity in the range corresponding to spectral range of halogen lamps of automobile headlights;
   a matrix transparent electrode on said broadband reflective base mirror;
   a photoconductive layer on said matrix transparent electrode, said photoconductive layer and said matrix transparent electrode having a matrix-type structure formed as a pixel array, each pixel of said matrix transparent electrode being a projection of an overlaid pixel of said photoconductive layer;
   a rear polarizer on said photoconductive layer, said rear polarizer having a predetermined axis of polarization;
   a common transparent electrode above said rear polarizer;
   a liquid crystal sandwiched and sealed between said rear polarizer and said common transparent electrode;
   a front polarizer on said common electrode and having an outer surface, and an axis of polarization parallel to said predetermined axis of polarization; and
   a control circuit connected between said common transparent electrode and said matrix transparent electrode, said control circuit having means for applying a voltage to said common transparent electrode and said matrix transparent electrode.

10. The liquid-crystal matrix-type reflection mirror of claim 9, further including a first insulation layer between said liquid crystal and said rear polarizer, a second insulation layer between said liquid crystal and said front polarizer, a first orientation layer between said first insulation layer and said rear polarizer, and a second orientation layer between said second insulation layer and said front polarizer.

11. The liquid-crystal matrix-type reflection mirror of claim 10, further including an antireflection coating on said outer surface of said front polarizer.

12. The liquid-crystal matrix-type reflection mirror of claim 9 wherein said common transparent electrode, said matrix transparent electrode are made of indium tin oxide, and said photoconductive layer is made of a material selected from the group consisting of cadmium selenide and cadmium sulfide.

13. The liquid-crystal matrix-type reflection mirror of claim 9 wherein each said pixel has its individually addressed electrode, said control circuit having a threshold device, said electrodes being connected to said means for applying a voltage through said threshold device.

14. The liquid-crystal matrix-type reflection mirror of claim 13 wherein said threshold device has a threshold value which corresponds to a predetermined intensity of dazzling light.

15. A liquid-crystal matrix-type reflection mirror with a localized dazzle light attenuation zone, said mirror having a multilayered structure and comprising:
   a broadband reflective base mirror having maximum reflectivity in the range corresponding to spectral range of halogen lamps of automobile headlights;
   a matrix transparent electrode on said broad band reflective base mirror;

a photoconductive layer on said matrix transparent electrode, said photoconductive layer and said matrix transparent electrode having a matrix-type structure formed of an array of pixels, each pixel of said matrix transparent electrode being a projection of and aligned with a corresponding pixel of said photoconductive layer;

a rear polarizer on said photoconductive layer, said rear polarizer having a predetermined axis of polarization;

a common transparent electrode above said rear polarizer;

a liquid crystal sandwiched and sealed between said rear polarizer and said common transparent electrode;

a front polarizer placed on said common electrode and having an outer surface, which faces an incident light, and an axis of polarization parallel to said predetermined axis of polarization;

a control circuit connected between said common transparent electrode and said matrix transparent electrode, said control circuit having means for applying a voltage to said common transparent electrode and said matrix transparent electrode;

a first insulation layer between said liquid crystal and said rear polarizer;

a second insulation layer between said liquid crystal and said front polarizer;

a first orientation layer between said first insulation layer and said rear polarizer, and a second orientation layer between said second insulation layer and said front polarizer.

16. The liquid-crystal matrix-type reflection mirror of claim 15, further including an antireflection coating on said outer surface of said front polarizer.

17. The liquid-crystal matrix-type reflection mirror of claim 15 wherein said mirror is a rearview mirror of a motor vehicle.

18. The liquid-crystal matrix-type reflection mirror of claim 17 wherein said common transparent electrode and said matrix transparent electrode are made of indium tin oxide, and said photoconductive layer is made of a material selected from the group consisting of cadmium selenide and cadmium sulfide.

19. The liquid-crystal matrix-type reflection mirror of claim 16 wherein each pixel of said array of pixels has a respective addressing electrode, said control circuit having a threshold device, said electrodes being connected to said means for applying a voltage through said threshold device.

20. The liquid-crystal matrix-type reflection mirror of claim 19 wherein said threshold device has a threshold value which corresponds to a predetermined intensity of dazzling light.

* * * * *